United States Patent
Harrington et al.

(10) Patent No.: US 10,750,399 B2
(45) Date of Patent: Aug. 18, 2020

(54) SATELLITE USER TERMINAL GATEWAY FOR A SATELLITE COMMUNICATION NETWORK

(71) Applicant: Hughes Network Systems LLC, Germantown, MD (US)

(72) Inventors: Emanuel Harrington, Bowie, MD (US); Frank Li, Herndon, VA (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 77 days.

(21) Appl. No.: 15/589,751

(22) Filed: May 8, 2017

(65) Prior Publication Data
US 2018/0324634 A1 Nov. 8, 2018

(51) Int. Cl.
| | |
|---|---|
| H04W 28/02 | (2009.01) |
| H04L 29/06 | (2006.01) |
| H04B 7/185 | (2006.01) |
| H04L 12/801 | (2013.01) |
| H04L 12/931 | (2013.01) |

(52) U.S. Cl.
CPC .... H04W 28/0273 (2013.01); H04B 7/18513 (2013.01); H04B 7/18517 (2013.01); H04B 7/18519 (2013.01); H04L 47/193 (2013.01); H04L 49/208 (2013.01); H04L 69/163 (2013.01)

(58) Field of Classification Search
CPC ............... H04L 12/56; H04L 2012/56; H04L 2012/5608; H04L 63/18; H04W 80/04; H04W 8/26; H04W 84/12; H04W 88/08; H04W 88/06; H04W 84/18; H04W 74/08; H04N 21/4341; H04B 7/212; H04B 7/2123; H04B 7/2121

USPC .... 370/389, 349, 310.2, 328, 338, 438, 439, 370/535, 321
See application file for complete search history.

(56) References Cited

U.S. PATENT DOCUMENTS

| | | | |
|---|---|---|---|
| 9,548,936 B2* | 1/2017 | Lee | H04L 47/28 |
| 2008/0043663 A1* | 2/2008 | Youssefzadeh | H04B 7/18528 370/321 |
| 2012/0213210 A1* | 8/2012 | Thomasson | H04B 7/18528 370/337 |
| 2016/0219024 A1* | 7/2016 | Verzun | H04L 63/102 |

OTHER PUBLICATIONS

Hughes, "Key Features of Hughes HN/HX Broadband Satellite Routers," pp. 1-17, Jan. 2009.

* cited by examiner

*Primary Examiner* — Brenda H Pham
(74) *Attorney, Agent, or Firm* — Global IP Counselors, LLP

(57) ABSTRACT

A satellite user terminal gateway which performs transmission control protocol acceleration to enhance communication speed between a satellite user terminal and a satellite communication network. The satellite user terminal gateway includes a transceiver configured to communicate with a satellite communication network to receive data packets from the satellite communication network, and a controller configured to control the transceiver. The satellite user terminal gateway further includes a processor configured to identify transmission control protocol data packets among the received data packets to mirror the transmission control protocol data packets to the controller while routing the received data packets through the satellite user terminal gateway.

18 Claims, 14 Drawing Sheets

SATELLITE USER TERMINAL GATEWAY FOR A SATELLITE COMMUNICATION NETWORK

BACKGROUND

Field of the Invention

The present invention generally relates to a satellite user terminal gateway for a satellite communication network. More particularly, the present invention relates to a gateway that is disposed at a satellite user terminal of a satellite communication network and performs transmission control protocol acceleration to enhance communication speed between the satellite user terminal and the satellite communication network.

Background Information

Communication networks, such as satellite communication networks, employ satellite communication terminals at end-user sites which communicate with one or more satellites in the satellite communication network. A satellite communication terminal typically employs an indoor unit which includes a satellite modem that enables communication with the satellite communication network. A satellite modem may include WiFi capability, along with local area network (LAN) and wide area network (WAN) interfaces.

SUMMARY

Although conventional satellite modems may provide WiFi, LAN and WAN capabilities, such conventional satellite modems fail to include more sophisticated functionality such as Voice Over IP (VoIP) capability, and hardware transmission control protocol (TCP) accelerator functionality.

Accordingly, disclosed embodiments provide a satellite user terminal gateway for a satellite communication network. The satellite user terminal gateway performs transmission control protocol acceleration to enhance communication speed between a satellite user terminal and a satellite communication network. The satellite user terminal gateway includes a transceiver configured to communicate with a satellite communication network to receive data packets from the satellite communication network, and a controller configured to control the transceiver. The satellite user terminal gateway further includes a processor configured to identify transmission control protocol data packets among the received data packets to mirror the transmission control protocol data packets to the controller while routing the received data packets through the satellite user terminal gateway.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
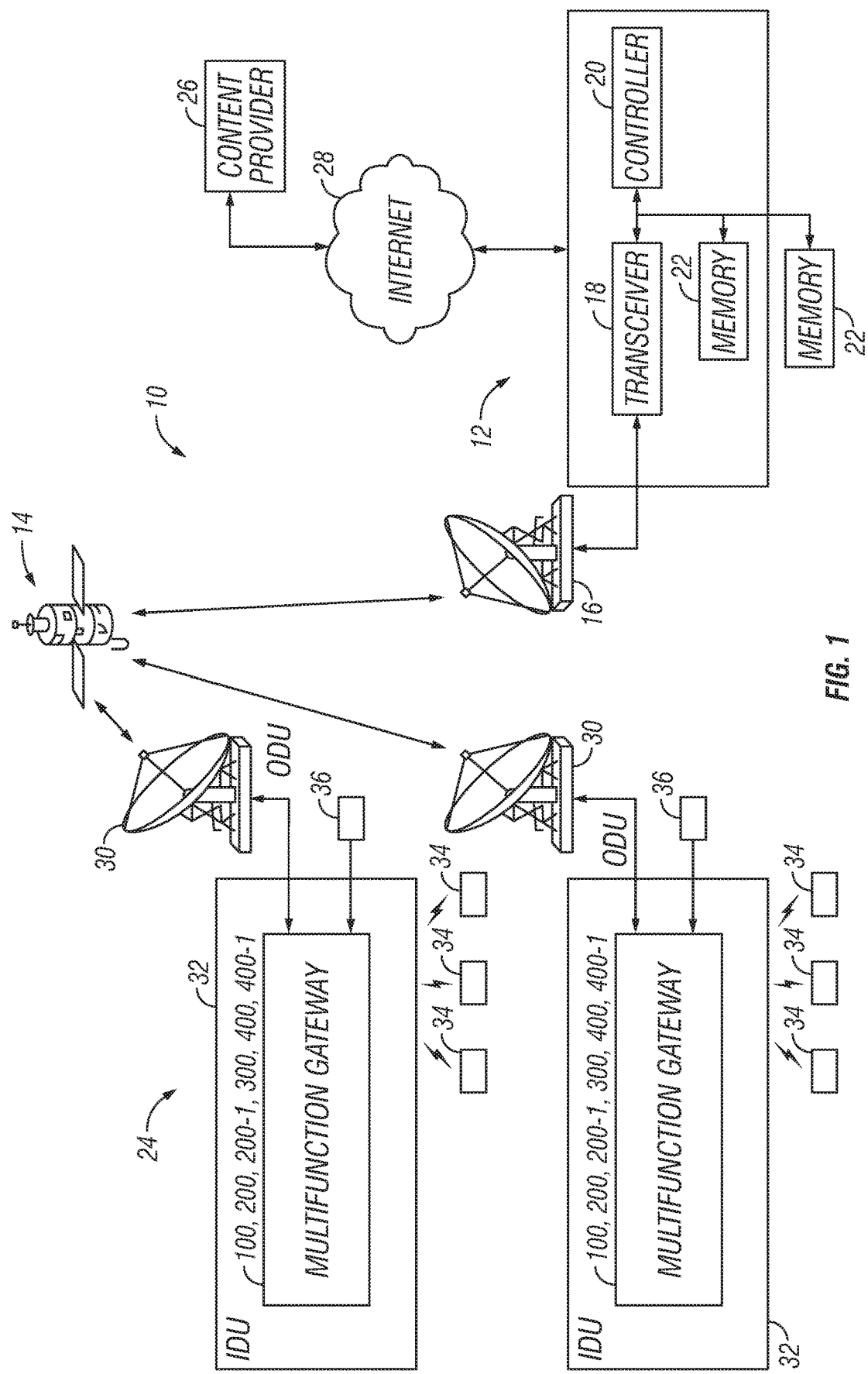
FIG. 1 illustrates an example of a satellite communication network according to a disclosed embodiment.

FIG. 1 illustrates an example of a satellite communication network 10 according to an exemplary embodiment. A satellite communication network 10 typically includes a plurality of terrestrially mounted gateways 12 that communicate with one or more orbiting satellites 14. Each satellite gateway includes an antenna dish 16, a transceiver 18, a controller 20, a memory 22 and other types of equipment (not shown) such as amplifiers, waveguides and so on as understood in the art on which enable communication between the gateway 12 and a plurality of satellite user terminals 24 via one or more of the orbiting satellites 14. The memory 22 can be, for example, an internal memory in the gateway 12, or other type of memory devices such as flash memory or hard drives with external high speed interface such as a USB bus or an SATA bus, or remote memories such as cloud storage and so on. These other types of memory can be present at the gateway 12 or accessible at a location apart from the gateway 12 via a network connection such as an Ethernet connection, a WiFi connection or any other suitable type of connection as understood in the art.

As understood in the art, the controller 20 preferably includes a microcomputer with a control program that controls the gateway 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present invention.

The gateway 12, satellites 14 and satellite user terminals 24 typically communicate with each other over a radio frequency link, such as a Ku-band link, a Ka-band link or any other suitable type of link as understood in the art. Also, one or more of the gateways 12 can be configured as a network management center or network operating center which, among other things, operate to communicate with remote sites, such as web content providers 26, via the Internet 28, cloud storage, or other communication networks as understood in the art. In addition, the gateways 12 can communicate with each other via, for example, the Internet 28 or other communication networks.

As further shown in FIG. 1, a satellite user terminal 24 typically includes an antenna dish 30 that is commonly referred to as an outdoor unit (ODU), and a device such as a set-top box or other type of equipment that is commonly referred to as an indoor unit (IDU) 32. The IDU 32 in this example includes a multifunction gateway 100, 200, 200-1, 300, 400 or 400-1 as described in detail below with regard to FIGS. 2 through 7. In the examples shown in FIGS. 2 through 7, each of the multifunction gateways 100, 200, 200-1, 300, 400 and 400-1 can be configured as a single satellite modem, and can therefore have all of the functionality described herein integrated into the single satellite modem. Thus, the multifunction gateways 100, 200, 200-1, 300, 400 and 400-1 enable the IDU 32 to communicate with end user devices 34 as discussed herein. Such end user devices 34 include, for example, desktop computers, laptop or notebook computers, tablets (e.g., iPads), smart phones, Smart TVs and any other suitable devices as understood in the art. Naturally, the communications between the access point 120 and the end user devices 34 can occur over wireless connections, such as WiFi connections, as well as wired connections as understood in the art. Also, the multifunction gateways 100, 200, 200-1, 300, 400 and 400-1 can support telephone calls with a telephone 36 as further discussed below.

Accordingly, as will be appreciated from the description herein, each of the multifunction gateways 100, 200, 200-1, 300, 400 and 400-1 that is configured as a single satellite modem serves as a gateway device for a home, a small to medium enterprise network, or any suitably sized network as understood in the art. The satellite modem gateway therefore can function as the backbone device for WAN communication, perform hardware TCP acceleration to improve satellite link throughput performance, function as a LAN router to provide data to network devices with wired connections, function as a WiFi Access Point providing data to network devices with wireless connections, perform VoIP functionality, and provide Analog Telephone Adapter (ATA) connection for telephone communication. All of these features are integrated into a single satellite modem, especially the TCP acceleration performed by hardware logic, along with WiFi and telephone central office functionality. As described in more detail below, the hardware TCP acceleration configuration with a TCP hardware filter can identify the ingress of TCP traffic while routing the ingress network traffic without delay (e.g., at line speed). The TCP hardware acceleration configuration therefore provides benefits such as the capability to totally offload the CPU spoofing task for traffic parsing, route all network traffic without delay, identify the TCP packets in real time, and mirror or flag the TCP packets to the CPU through the network for TCP spoofing without software parsing packets at the same time as sending data to the LAN. Furthermore, the VoIP feature could be used to allow emergency communication during events such as power outages with the satellite modem disabling all functionality, other than phone communication, when a backup battery power source is active.

Figure 2:
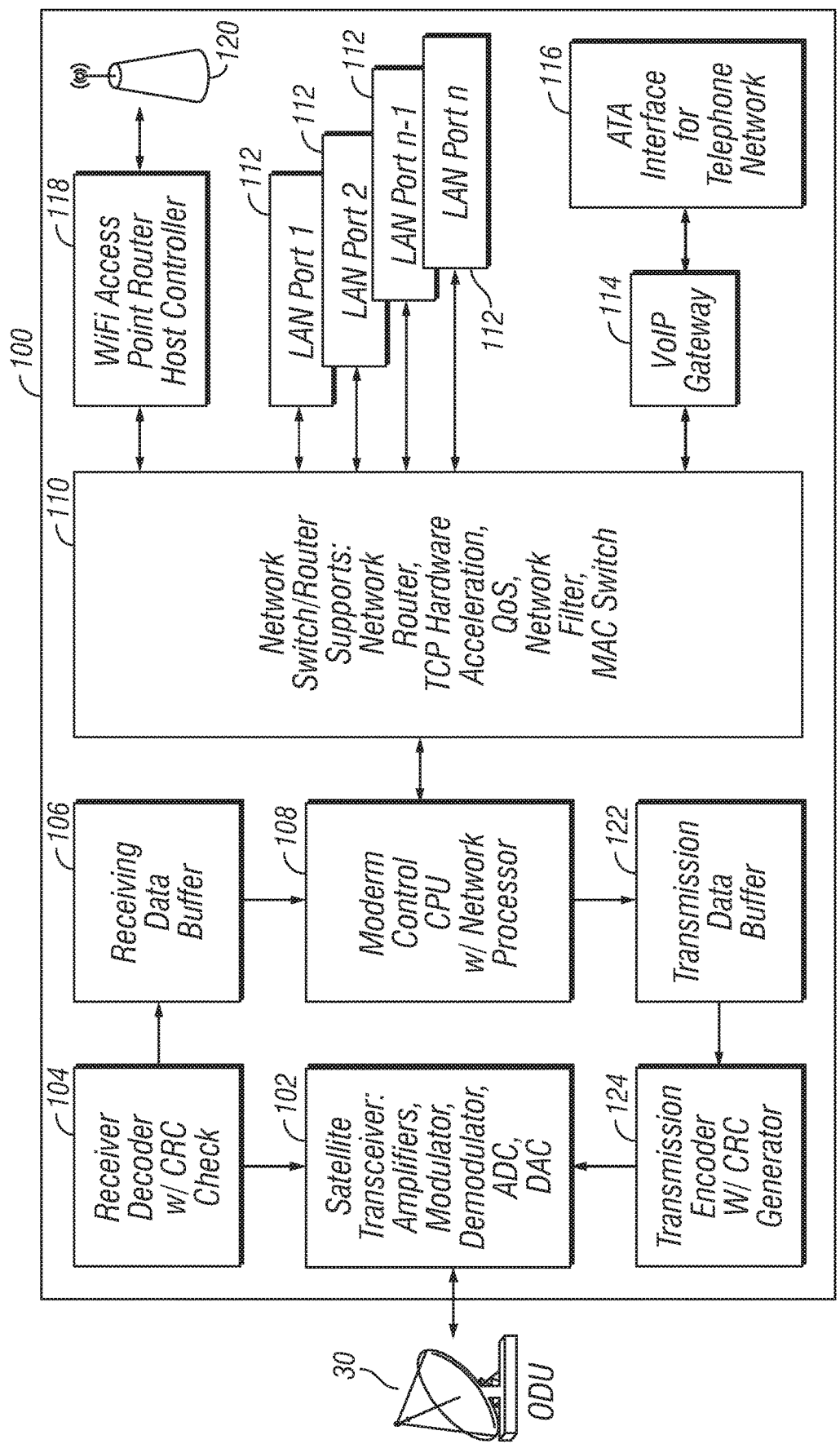
FIG. 2 is a conceptual block diagram illustrating an example of components of a satellite multifunction gateway that is disposed at a satellite user terminal of the satellite communication network shown in FIG. 1 and includes an LAN-based analog telephone adapter (ATA)

As shown, for example, in FIG. 2, the multifunction gateway 100 includes a satellite transceiver 102 that communicates with the ODU 30 via a cable or in any other suitable manner as understood in the art. The satellite transceiver 102 can include, for example, amplifiers, modulators, demodulators, analog-to-digital convertors (ADCs), digital-to-analog converters (DACs) and any other suitable equipment as understood in the art on which enable communication between the satellite user terminal 24 and one or more gateways 12 via one or more of the orbiting satellites 14. The multifunction gateway 100 further includes a receiver decoder 104 that decodes data received by the satellite transceiver 102 from the satellite 14 via the ODU 30. The receiver decoder 104 can also perform a cyclic redundancy check (CRC) on the received data in any suitable manner as understood in the art. The multifunction gateway 100 further includes a receiving data buffer 106, which can be configured in an internal memory in the multifunction gateway 100. The receiver decoder 104 outputs the received data on which the CRC has been performed to a receiving data buffer 106.

The multifunction gateway 100 also includes a modem control central processing unit (CPU) 108 having, for example, a network processor. The modem control CPU 108 preferably includes a microcomputer with a control program that controls the components of the multifunction gateway 100 of the satellite user terminal 24 as discussed herein. The modem control CPU 108 can also include other conventional components such as an input interface circuit, an output interface circuit, and storage devices such as a ROM (Read Only Memory) device and a RAM (Random Access Memory) device. The RAM and ROM store processing results and control programs that are run by the modem control CPU 108. The modem control CPU 108 is operatively coupled to the components of the satellite user terminal 24 as appropriate, in a conventional manner. It will be apparent to those skilled in the art from this disclosure that the precise structure and algorithms for the modem control CPU 108 can be any combination of hardware and software that will carry out the functions of the present invention.

The buffered data in the receiving data buffer 106 is output to the modem control CPU 108. The multifunction gateway 100 further includes a network switch/router 110. The network switch/router 110 can be controlled by the modem control CPU 108, or by an internal or external microcomputer. The network switch/router 110 is configured to support the functionality of a network router, TCP hardware acceleration operations, quality of service (QoS) operations, network filtering operations, and media access control (MAC) switching operations as discussed herein. Thus, the network switch/router 110 preferably includes a microcomputer with a control program that provides the functionality of the network router, TCP hardware acceleration operations, quality of service (QoS) operations, network filtering operations, and media access control (MAC) switching operations as discussed herein. The network switch/router 110 can also include other conventional components such as an input interface circuit, an output interface circuit, and storage devices such as a ROM (Read Only Memory) device and a RAM (Random Access Memory) device. The RAM and ROM store processing results and control programs that are run by the network switch/router 110. The network switch/router 110 is operatively coupled to the components of the satellite user terminal 24 as appropriate, in a conventional manner. It will be apparent to those skilled in the art from this disclosure that the precise structure and algorithms for the network switch/router 110 can be any combination of hardware and software that will carry out the functions of the present invention.

The multifunction gateway 100 further includes a plurality of local area network (LAN) ports 112 that communicate with the network switch/router 110 to receive data from LANs and to send data to LANs as discussed herein. In addition, the multifunction gateway 100 includes a voice over IP (VoIP) gateway 114 and an analog telephone adapter (ATA) interface 116 for a telephone network. The VoIP gateway 114 that functions as a gateway between the network switch/router 110 and the ATA interface 116 to provide data to the telephone network and to receive data from the telephone network as discussed herein. The multifunction gateway 100 also includes a WiFi access point router host controller 118 and an access point 120. The WiFi access point router host controller 118 communicates data between the network switch/router 110 and the access point 120 as discussed herein. The access point 120 can be a wireless access point (WAP) or any other suitable device, which enables the multifunction gateway 100 to provide data to the end user devices 34 shown in FIG. 1, and to receive data from the end user devices 34, as discussed herein.

The multifunction gateway 100 further includes a transmission data buffer 122, which can be configured in an internal memory in the multifunction gateway 100. The transmission data buffer 122 receives and buffers data from the network switch/router 110. The multifunction gateway 100 also includes a transmission encoder 124. The transmission data buffer 122 outputs the buffered data to the transmission encoder 124 that encodes data for transmission by the satellite transceiver 102 via the ODU 30 to the satellite 14 for delivery to the gateway 12 as shown in FIG. 1. The transmission encoder 124 can also perform a cyclic redundancy check (CRC) on the data to be transmitted in any suitable manner as understood in the art.

Figure 3:
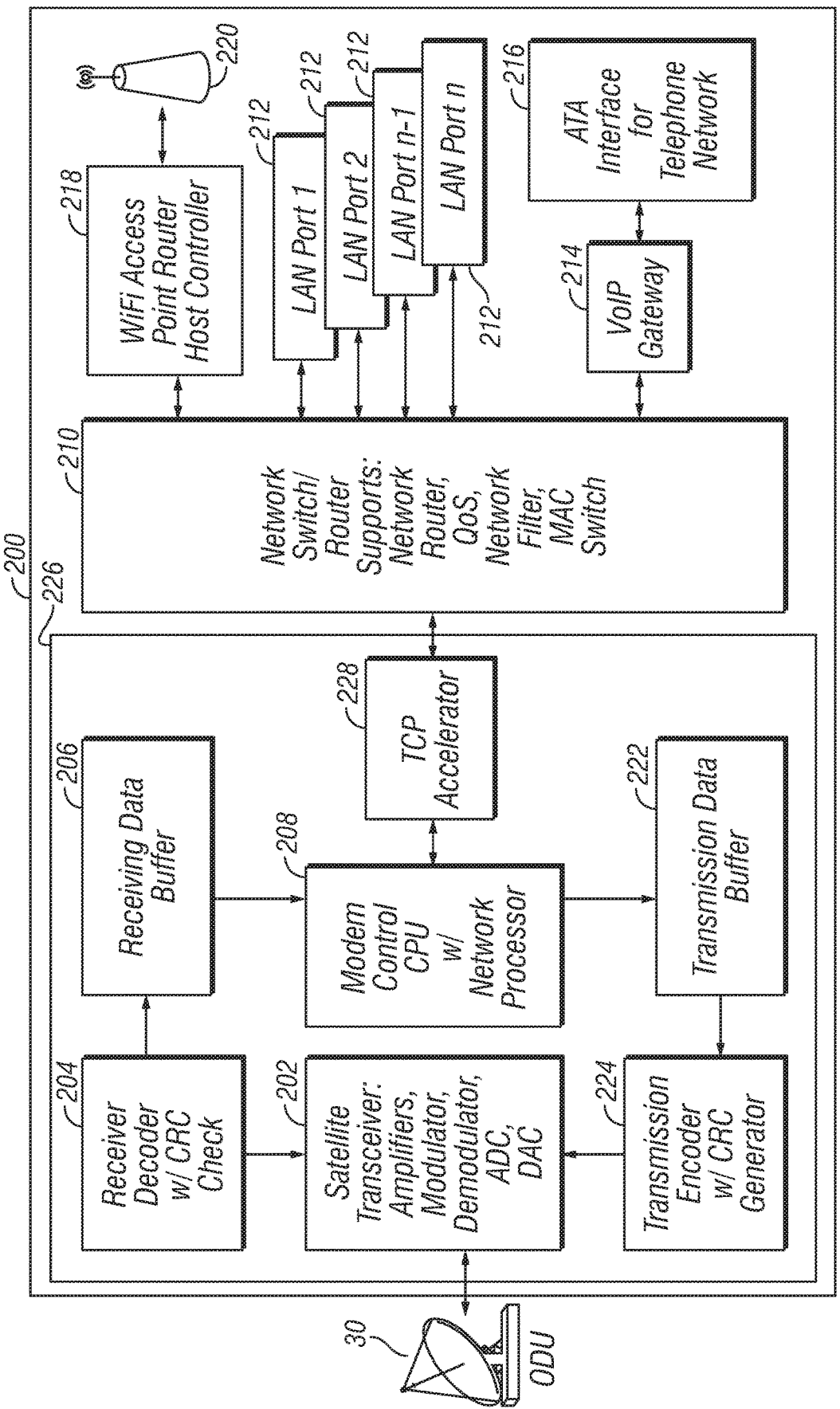
FIG. 3 is a conceptual block diagram illustrating an example of components of a satellite multifunction gateway as shown in FIG. 2, further including an ASIC with a hardware TCP accelerator in front of the network switch.

FIG. 3 illustrates a further example of a multifunction gateway 200. The multifunction gateway 200 is basically identical to multifunction gateway 100 described above, and includes a satellite transceiver 202, a receiver decoder 204, a receiving data buffer 206, a modem control CPU 208, a network switch/router 210, a plurality of local area network (LAN) ports 212, a voice over IP (VoIP) gateway 214 an ATA interface 216, a WiFi access point router host controller 218, an access point 220, a transmission data buffer 222 and a transmission encoder 224 which are identical or at least similar in configuration and operation to the satellite transceiver 102, the receiver decoder 104, the receiving data buffer 106, the modem control CPU 108, the network switch/router 110, the plurality of local area network (LAN) ports 112, the voice over IP (VoIP) gateway 114, the ATA interface 116, the WiFi access point router host controller 118, the access point 120, the transmission data buffer 122 and the transmission encoder 124, respectively, as described above with regard to FIG. 2. However, in this example of multifunction gateway 200, the satellite transceiver 202, the receiver decoder 204, the receiving data buffer 206, the modem control CPU 208, the transmission data buffer 222 and the transmission encoder 224 are disposed on an application-specific integrated circuit (ASIC) 226. Furthermore, the multifunction gateway 200 includes a hardware TCP accelerator 228 that is disposed on the ASIC 226 in this example between the modem control CPU 208 and the network switch/router 210, and thus in front of the network switch/router 210, instead of the TCP accelerator being part of the network/switch router 110 as in the multifunction gateway 100. Therefore, data sent from the modem control CPU 208 to the network switch/router 210, and data sent from the network switch/router 210 to the modem control CPU 208, are processed by the hardware TCP accelerator 228 as discussed below.

Figure 4:
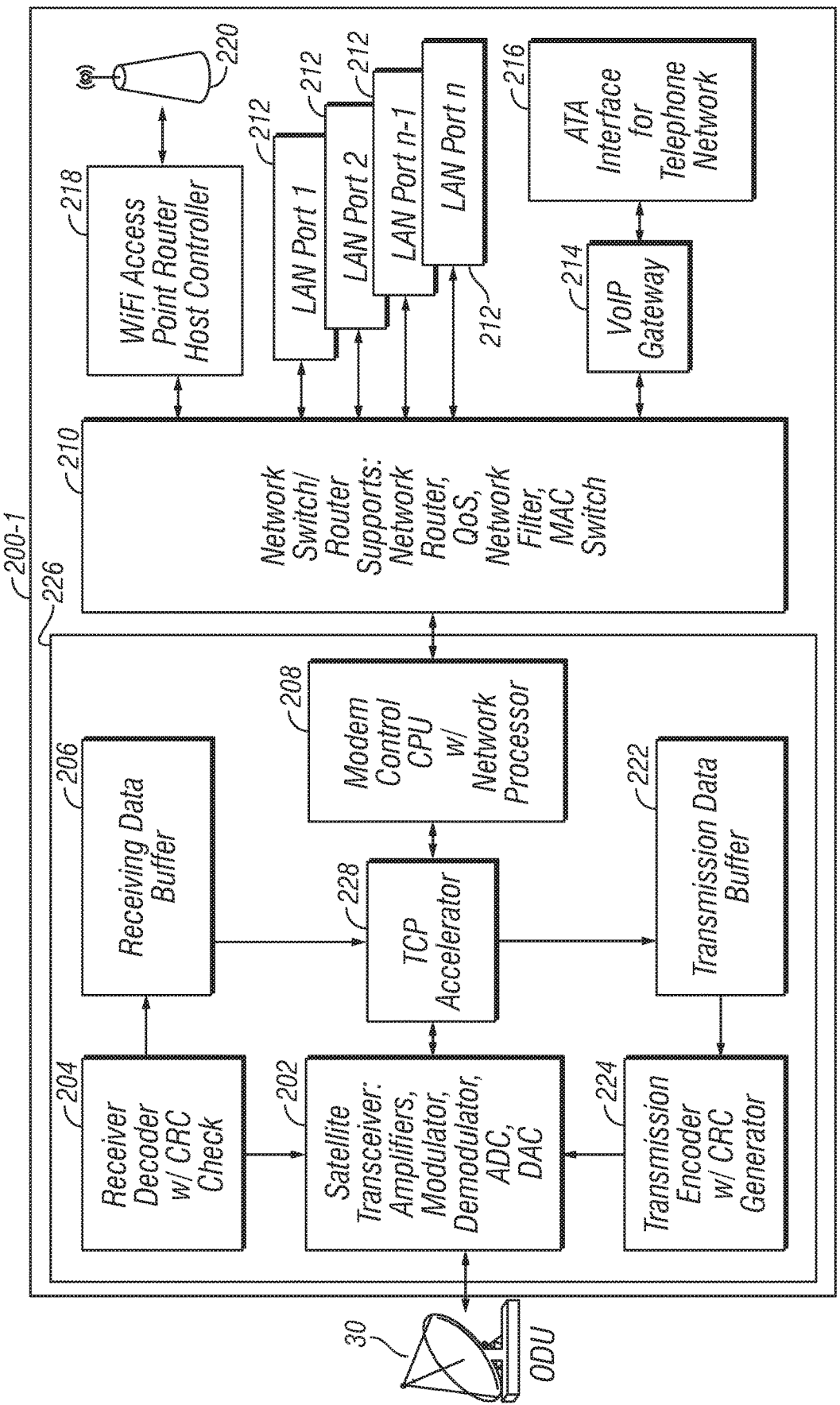
FIG. 4 is a conceptual block diagram illustrating an example of components of a satellite multifunction gateway as shown in FIG. 3, further including an ASIC with a hardware TCP accelerator in front of the controller.

FIG. 4 illustrates a multifunction gateway 200-1, which has an alternative configuration to multifunction gateway 200 shown in FIG. 3. In particular, in the multifunction gateway 200-1, the hardware TCP accelerator 228 is disposed on the ASIC 226 in front of the modem control CPU 208.

Figure 5:
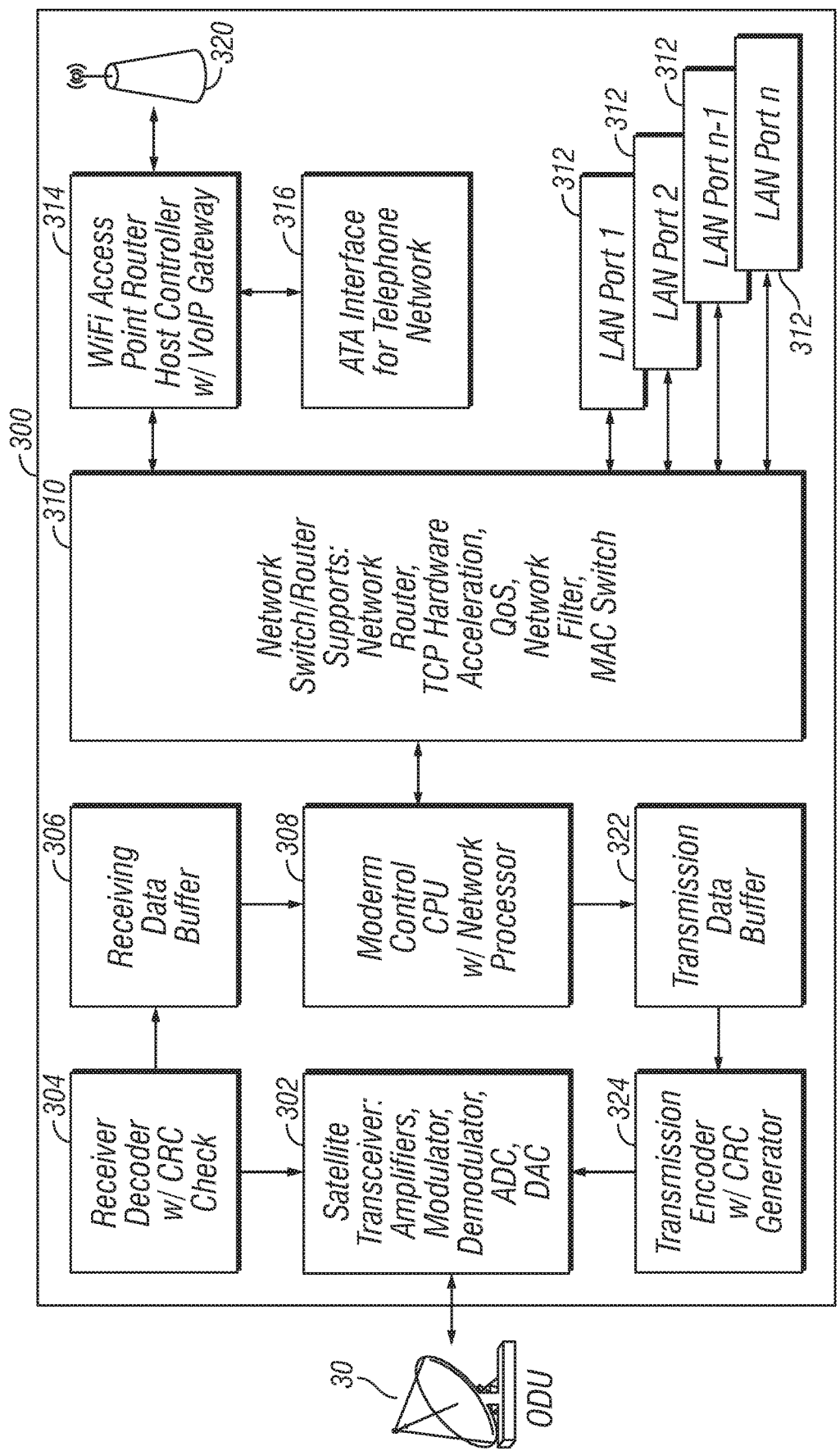
FIG. 5 is a conceptual block diagram illustrating an example of components of a satellite multifunction gateway that is disposed at a satellite user terminal of the satellite communication network shown in FIG. 1 and includes a WiFi-controlled ATA.

FIG. 5 illustrates a further example of a multifunction gateway 300. The multifunction gateway 300 is similar to multifunction gateway 100 described above, and includes a satellite transceiver 302, a receiver decoder 304, a receiving data buffer 206, a modem control CPU 308, a network switch/router 310, a plurality of local area network (LAN) ports 312, an ATA interface 316, an access point 320, a transmission data buffer 322 and a transmission encoder 324 which are identical or at least similar in configuration and operation to the satellite transceiver 102, the receiver decoder 104, the receiving data buffer 106, the modem control CPU 108, the network switch/router 110, the plurality of local area network (LAN) ports 112, the ATA interface 116, the access point 120, the transmission data buffer 122 and the transmission encoder 124, respectively, as described above with regard to FIG. 2. However, this example of multifunction gateway 300 includes a combined WiFi access point router host controller/voice over IP (VoIP) gateway 314, which couples the network switch/router 310 to the ATA interface 216 and the access point 320, and operates in a manner similar to the voice over IP (VoIP) gateway 114 and the WiFi access point router host controller 118 as described above with regard to FIG. 2.

Figure 6:
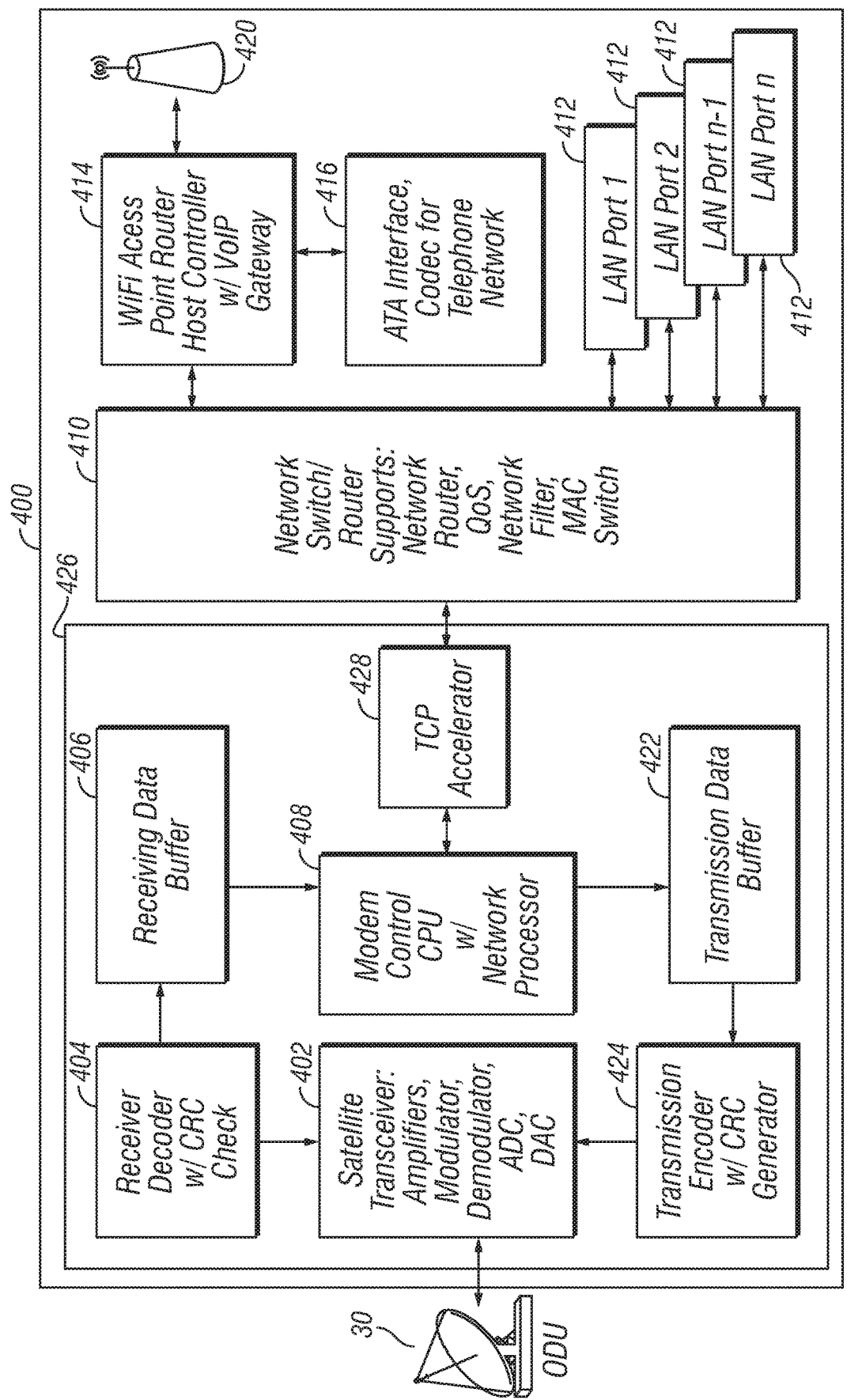
FIG. 6 is a conceptual block diagram illustrating an example of components of a satellite multifunction gateway as shown in FIG. 5, further including an ASIC with a hardware TCP accelerator in front of the network switch.

FIG. 6 illustrates a further example of a multifunction gateway 400. The multifunction gateway 400 is basically identical to multifunction gateway 300 described above, and includes a satellite transceiver 402, a receiver decoder 404, a receiving data buffer 406, a modem control CPU 408, a network switch/router 410, a plurality of local area network (LAN) ports 412, a combined WiFi access point router host controller/voice over IP (VoIP) gateway 414, an ATA interface 416, an access point 420, a transmission data buffer 422 and a transmission encoder 424 which are identical or at least similar in configuration and operation to the satellite transceiver 302, the receiver decoder 304, the receiving data buffer 306, the modem control CPU 308, the network switch/router 310, the plurality of local area network (LAN) ports 312, the combined WiFi access point router host controller/voice over IP (VoIP) gateway 314, the ATA interface 316, the access point 320, the transmission data buffer 322 and the transmission encoder 324, respectively, as described above with regard to FIG. 5. However, in this example of multifunction gateway 400, the satellite transceiver 402, the receiver decoder 404, the receiving data buffer 406, the modem control CPU 408, the transmission data buffer 422 and the transmission encoder 424 are disposed on an application-specific integrated circuit (ASIC) 426. Furthermore, the multifunction gateway 400 includes a hardware TCP accelerator 428 that is disposed on the ASIC 426 in this example between the modem control CPU 408 and the network switch/router 410, instead of the TCP accelerator being part of the network/switch router 310 as in the multifunction gateway 300. Therefore, data sent from the modem control CPU 408 to the network switch/router 410, and data sent from the network switch/router 410 to the modem control CPU 408, are processed by the hardware TCP accelerator 428 as discussed below.

Figure 7:
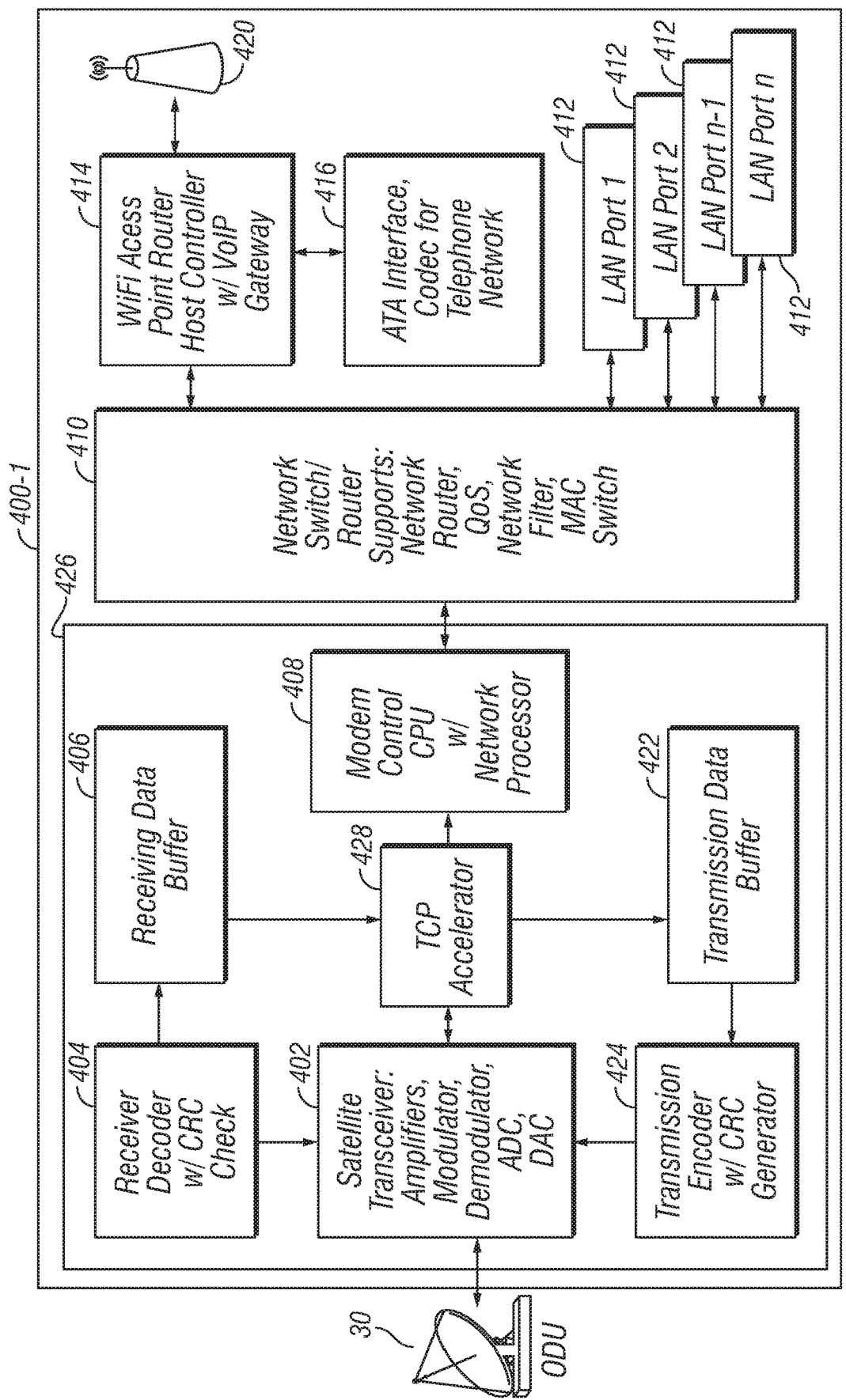
FIG. 7 is a conceptual block diagram illustrating an example of components of a satellite multifunction gateway as shown in FIG. 6, further including an ASIC with a hardware TCP accelerator in front of the controller.

FIG. 7 illustrates a multifunction gateway 400-1, which has an alternative configuration to multifunction gateway 400 shown in FIG. 6. In particular, in the multifunction gateway 400-1, the hardware TCP accelerator 428 is disposed on the ASIC 426 in front of the modem control CPU 408.

Figure 8:
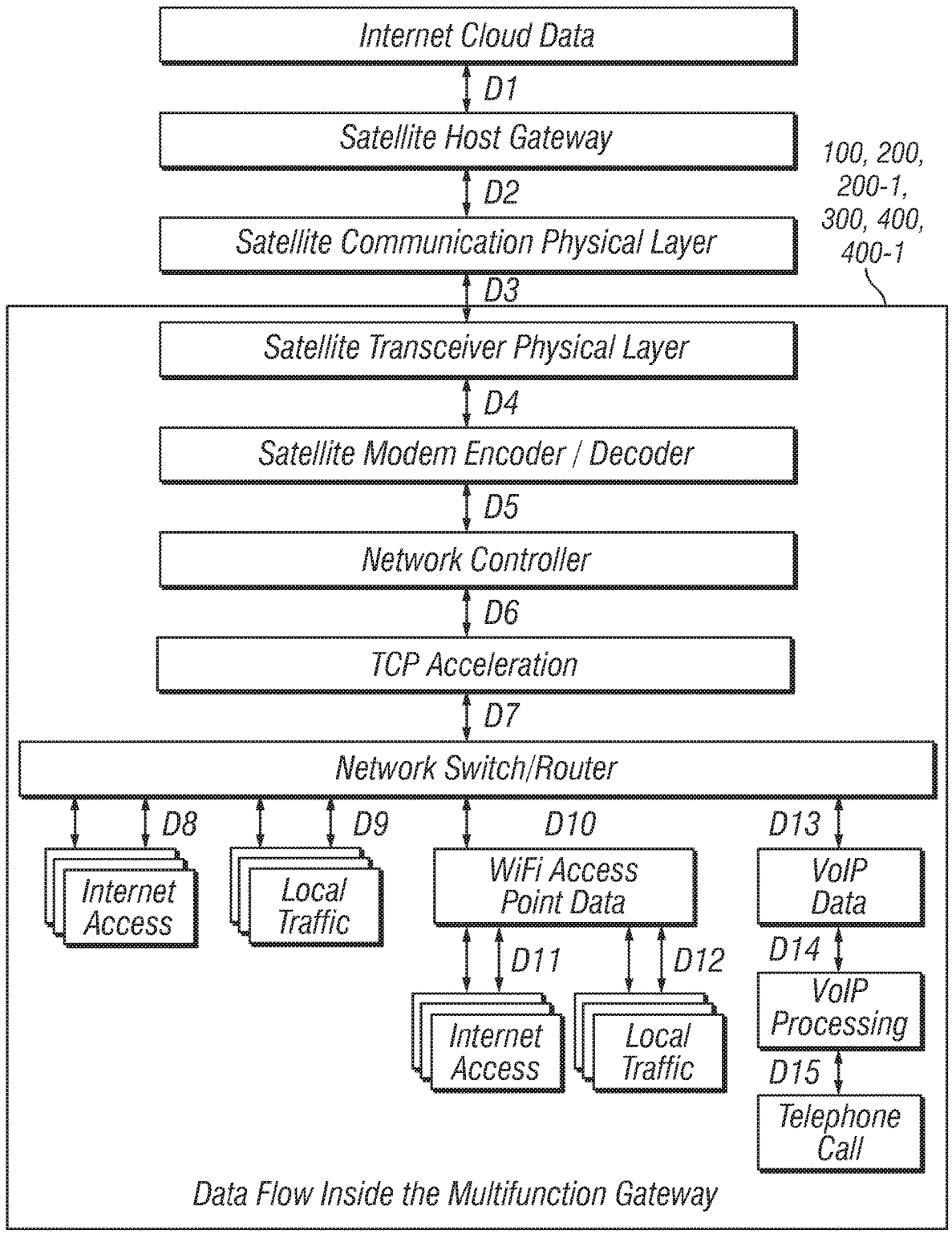
FIG. 8 is a conceptual diagram illustrating an example of data flow within a satellite communication network as shown in FIG. 1, including an example of data flow within a satellite multifunction gateway as shown in FIGS. 2 through 7.

FIG. 8 is a conceptual diagram illustrating an example of data flow within a satellite communication network as shown in FIG. 1, including an example of data flow within a satellite multifunction gateway 100, 200, 200-1 300, 400 and 400-1 as shown in FIGS. 2 through 7. As indicated, data flow D1 occurs between the Internet 28 and the gateway 12, and data flow D2 occurs over the physical layer, such as the antenna dish 16 and the transceiver 18 of the gateway 12, a satellite 14, and an antenna dish 30 of a satellite user terminal 24, shown in FIG. 1. Data flow D3 occurs between, for example, the antenna dish 30 and the satellite transceiver 102, 202, 302 and 402, respectively.

Within a satellite multifunction gateway 100, 200, 200-1 300, 400 and 400-1, data flow D4 occurs between the satellite transceiver 102, 202, 302, 402 and the receiver decoder 104, 204, 304 and 404, respectively, and also between the satellite transceiver 102, 202, 302, 402 and the transmission encoder 124, 224, 324 and 424, respectively. Data flow D5 occurs between the receiver decoder 104, 204, 304 and 404 and the modem control CPU 108, 208, 308 and 408 of the satellite multifunction gateway 100, 200, 300 and 400, respectively. Likewise, data flow D5 occurs between the transmission encoder 124, 224, 324 and 424 and the modem control CPU 108, 208, 308 and 408, respectively.

In multifunction gateways 200, 200-1, 400 and 400-1 that include the hardware TCP accelerator 228 and 428, respectively, data flow D6 occurs between the modem control CPU 208 and 408 and the hardware TCP accelerator 228 and 428, respectively. Thus, in multifunction gateways 200 and 400, data flow D7 occurs between the hardware TCP accelerator 228 and 428 and the network switch/router 210 and 410, respectively. However, in multifunction gateways 100 and 300 that do not include a hardware TCP accelerator outside of the network/switch router 100 and 300, data flow D6/D7 simply occurs between the modem control CPU 108 and 308 and the network switch/router 110 and 310, respectively.

As further shown in FIG. 6, data flow D8 occurs between the network switch/router 110, 210, 310 and 410 and, for example, the LAN ports 112, 212, 312 and 412, respectively, to allow for access to the Internet due to the data flow D1 through D7 as described above by the end user devices 34 via, for example, the LAN ports 112, 212, 312 and 412, respectively. Also, the data flow D9 of local data traffic occurs between the network switch/router 110, 210, 310 and 410 and, for example, the LAN ports 112, 212, 312 and 412, respectively, so that such local data traffic could be accessed by, for example, the end user devices 34 via the LAN ports 112, 212, 312 and 412.

In addition, data flow D10 occurs between the network switch/router 110 and 210, and the WiFi access point router host controller 118 and 318, respectively, of the multifunction gateways 100, 200 and 200-1. Therefore, the end user devices 34 can obtain Internet access via the data flow D11 at the WiFi access point router host controller 118 and 218, and can access local data traffic via the data flow D12 at the WiFi access point router host controller 118 and 218, of the multifunction gateways 100, 200 and 200-1. Furthermore, data flow D13 occurs between the network switch/router 110 and 210, and the VoIP gateway 114 and 214, respectively. Accordingly, data flow D14 occurs between the VoIP gateway 114 and 214, and the ATA interface 116 and 216, respectively. Thus, telephone calls can occur due to the data flow D15 between a telephone 36, as shown in FIG. 1, and the ATA interface 116 and 216.

As discussed above, multifunction gateways 300, 400 and 400-1 are configured to include a combined WiFi access point router host controller/voice over IP (VoIP) gateway 314 and 414, respectively. Thus, data flows D10 and D13 occur between the network switch/router 310 and 410 and the combined WiFi access point router host controller/voice over IP (VoIP) gateway 314 and 414, respectively. Data flows D11 and D12 thus occur between the combined WiFi access point router host controller/voice over IP (VoIP) gateway 314 and 414 and the end user devices 34. Likewise, data flow D14 occurs between the combined WiFi access point router host controller/voice over IP (VoIP) gateway 314 and 414, and the ATA interface 316 and 416, respectively. Telephone calls can thus occur due to the data flow D15 between a telephone 36, as shown in FIG. 1, and the ATA interface 316 and 416.

Figure 9:
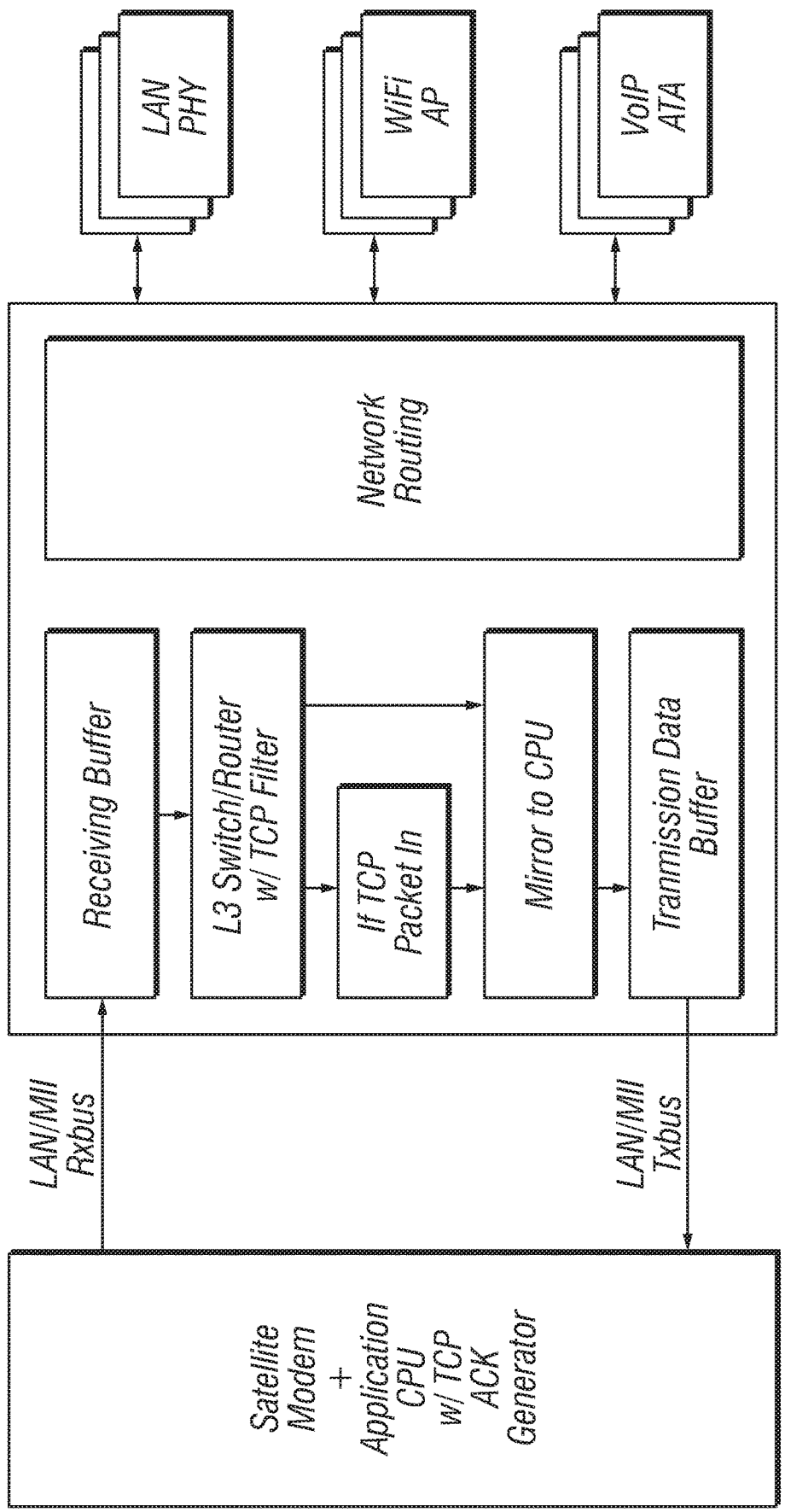
FIG. 9 is a conceptual block diagram illustrating an example of the functionality of a hardware TCP accelerator built with a layer 3 network switch or router as employed within a satellite multifunction gateway as shown in FIGS. 2 and 5.
Figure 10:
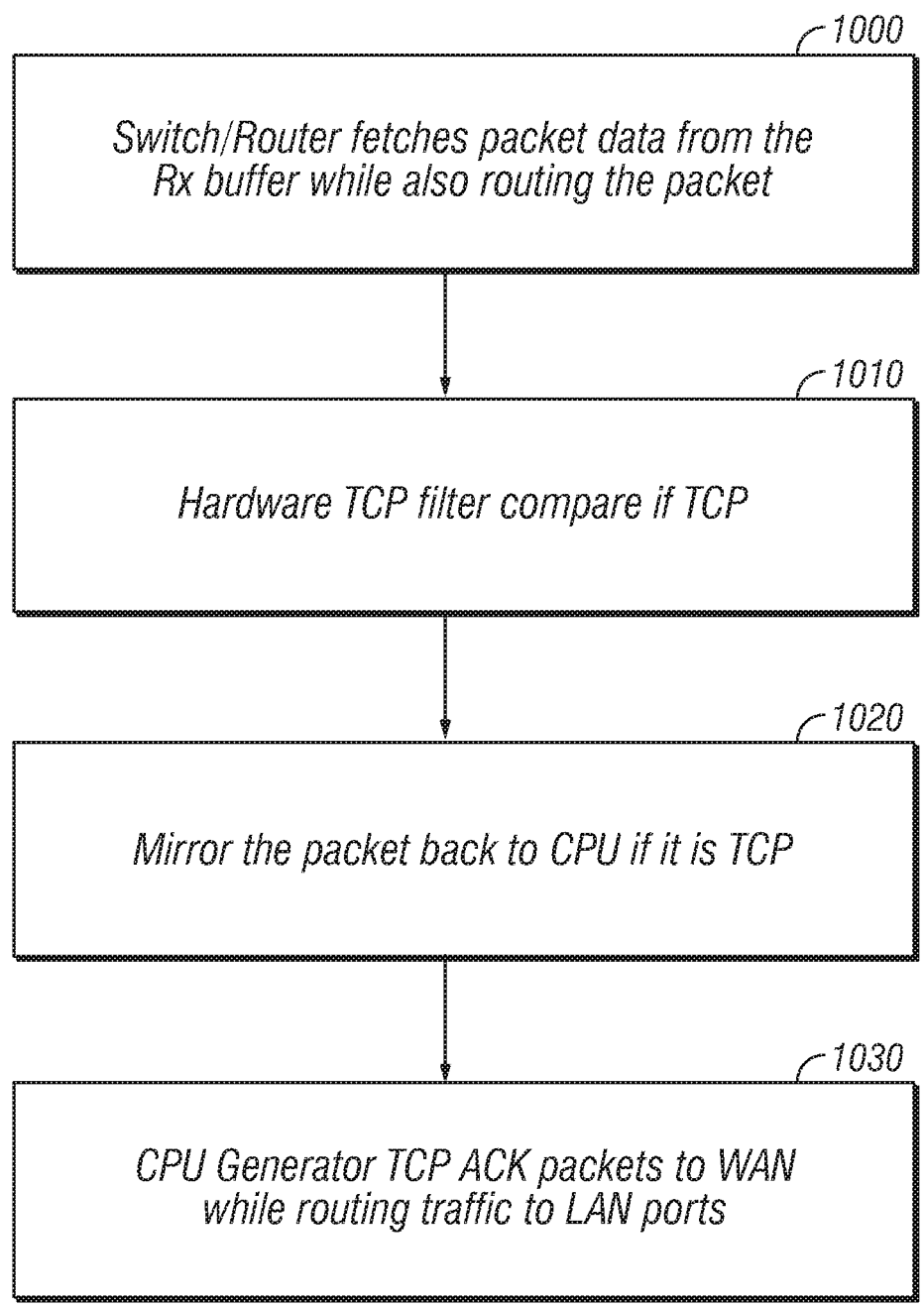
FIG. 10 is a flow chart illustrating an example of operations performed using the hardware TCP accelerator as shown in FIG. 9.

FIG. 9 is a conceptual block diagram illustrating an example of the functionality of a hardware TCP accelerator built with a layer 3 network switch or router as employed within a satellite multifunction gateway 100 and 300 as shown in FIGS. 2 and 5, respectively, and FIG. 10 is a flow chart illustrating an example of operations performed using the hardware TCP accelerator as shown in FIG. 9. During operation 1000 in FIG. 100, the network switch/router 110 and 310 of the satellite multifunction gateway 100 and 300, respectively, fetches a data packet from the receiving data buffer 106 and 306, respectively, while also routing the data packet. In operation 1010, the TCP accelerator functionality of the satellite multifunction gateway 100 and 300, respectively, determines if the data packet is a TCP packet. In operation 1020, the TCP accelerator functionality of the satellite multifunction gateway 100 and 300, respectively, mirrors the TCP data packet back to the modem control CPU 108 and 308. In operation 1030, the TCP functionality generates a TCP acknowledgement packet back to the network switch/router 110 and 310 of the multifunction gateway 100 and 300, respectively, and thus to the WAN via, for example, the LAN ports 112 and 312, respectively, while the network switch/router 110 and 310 routes traffic to the LAN ports 112 and 312, respectively.

Figure 11:
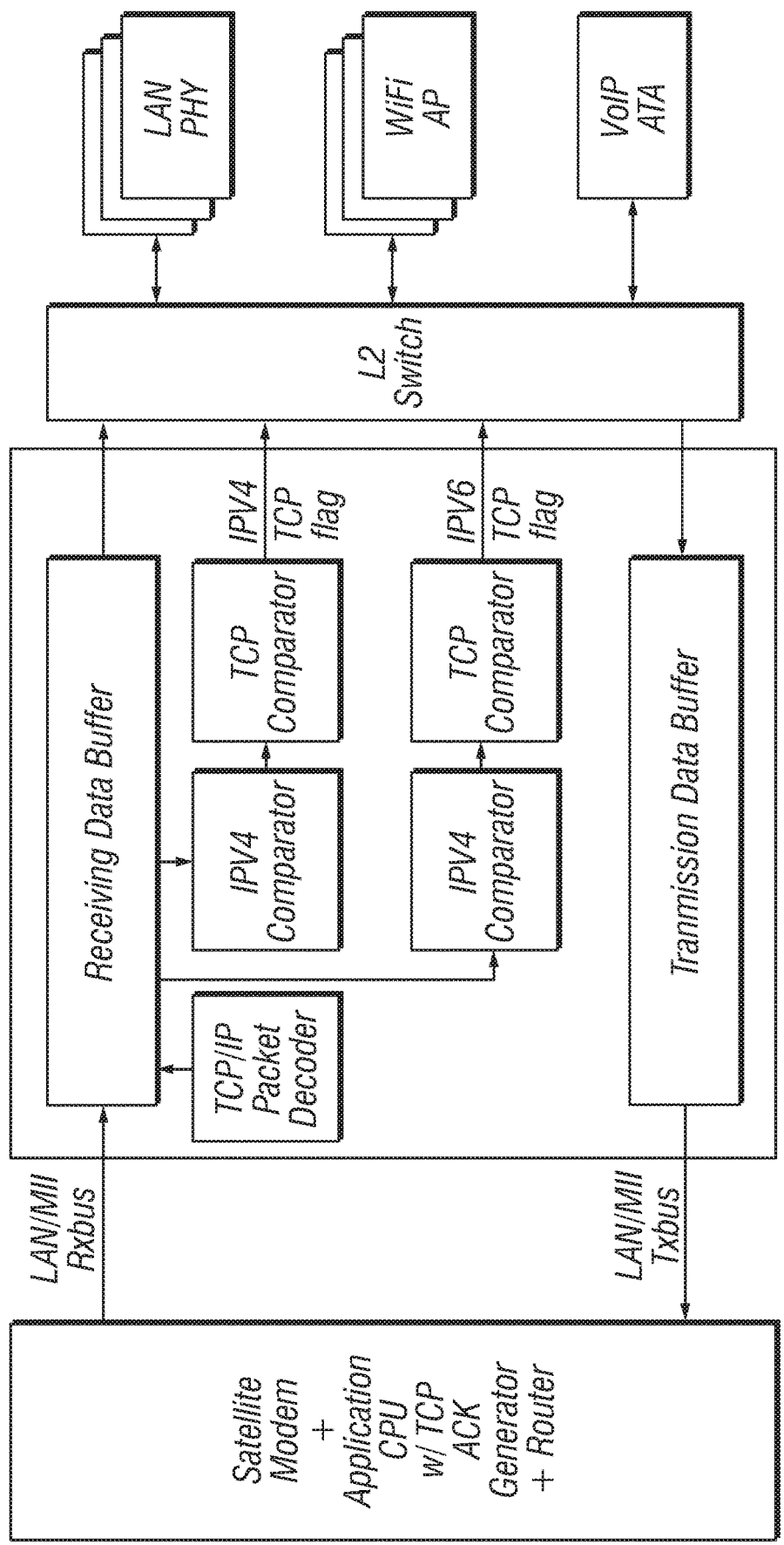
FIG. 11 is a conceptual block diagram illustrating an example of the functionality of a hardware TCP accelerator built in front of a layer 2 network switch as employed within a satellite multifunction gateway as shown in FIGS. 3 and 6.
Figure 12:
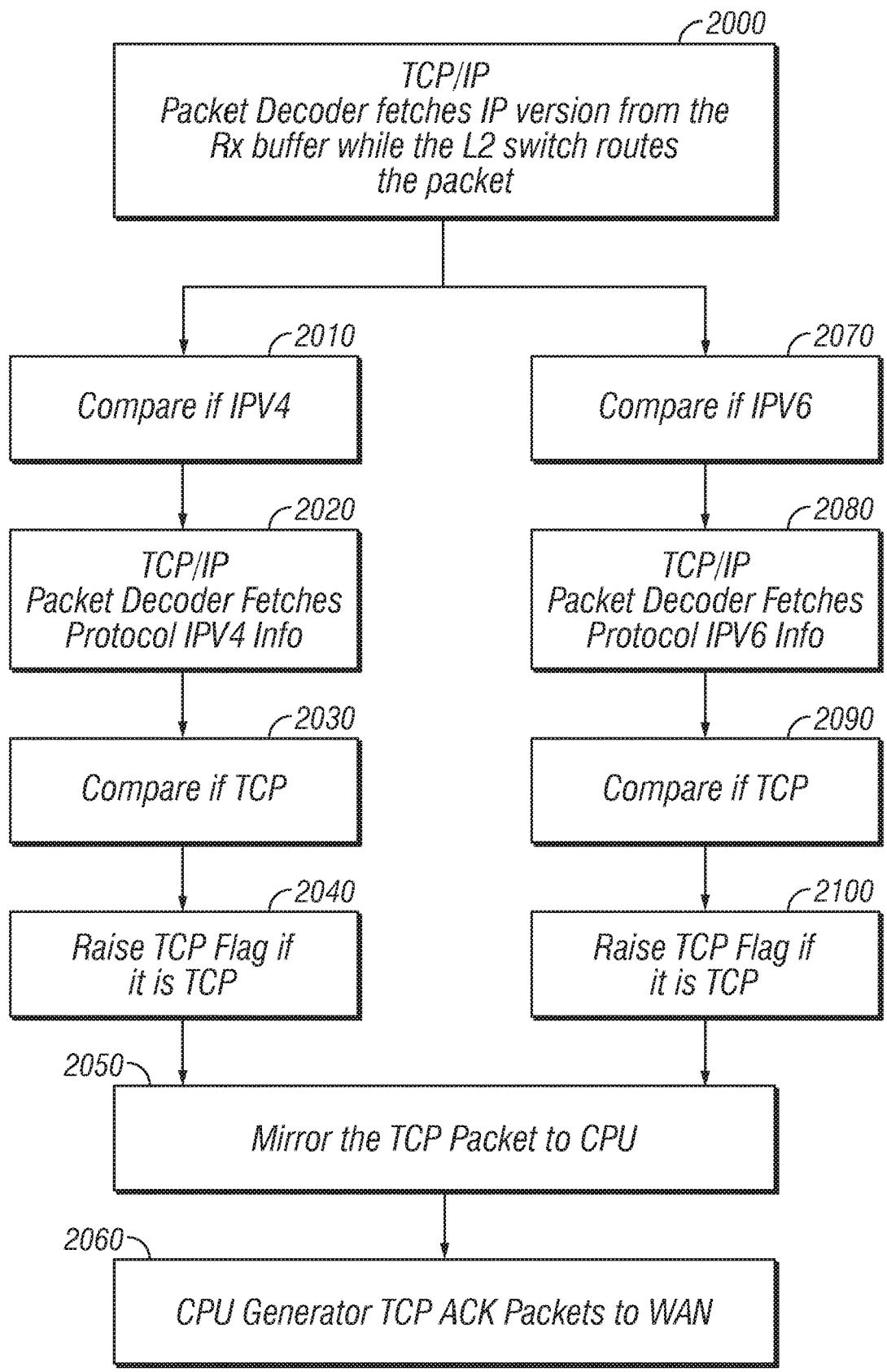
FIG. 12 is a flow chart illustrating an example of operations performed using the hardware TCP accelerator as shown in FIG. 11.

FIG. 11 is a conceptual block diagram illustrating an example of the functionality of a hardware TCP accelerator built in front of a layer 2 network switch as employed within a satellite multifunction gateway 200 and 400 as shown in FIGS. 3 and 6, and FIG. 12 is a flow chart illustrating an example of operations performed by the hardware TCP accelerator as shown in FIG. 11.

During operation 2000 in FIG. 12, the network switch/router 210 and 410 fetches a data packet from the receiving data buffer 206 and 406, respectively, of the satellite multifunction gateway 200 and 400 while also routing the data packet. In operation 2010, the TCP accelerator functionality of the satellite multifunction gateway 200 and 400, respectively, whether the data packet is an Internet Protocol Version 4 (IPv4) data packet. If the data packet is an IPv4 data packet, in operation 2020, the TCP accelerator functionality of the satellite multifunction gateway 200 and 400 fetches IPv4 protocol information. Then, in operation 2030, the TCP accelerator functionality of the satellite multifunction gateway 200 and 400 determines whether the data packet is a TCP data packet. In operation 2040, the TCP accelerator functionality provides a flag indicating that the data packet is a TCP data packet. Accordingly, in operation 2050, the TCP accelerator functionality mirrors the TCP data packet back to the modem control CPU 208 and 408 of the satellite multifunction gateway 200 and 400, respectively. In operation 2060, the TCP functionality generates a TCP acknowledgement packet back to the network switch/router 210 and 410 of the multifunction gateway 200 and 400, respectively, and thus to the WAN via, for example, the LAN ports 212 and 412, respectively, while the network switch/router 210 and 410 routes the data packet to the LAN ports 212 and 412, respectively.

As further shown in FIG. 12, in operation 2070, the TCP accelerator functionality of the satellite multifunction gateway 200 and 400, respectively, whether the data packet is an Internet Protocol Version 6 (IPv6) data packet. If the data packet is an IPv6 data packet, in operation 2080, the TCP accelerator functionality of the satellite multifunction gateway 200 and 400 fetches IPv6 protocol information. Then, in operation 2090, the TCP accelerator functionality of the satellite multifunction gateway 200 and 400 determines whether the data packet is a TCP data packet. In operation 2100, the TCP accelerator functionality provides a flag indicating that the data packet is a TCP data packet. Accordingly, in operation 2050, the TCP accelerator functionality mirrors the TCP data packet back to the modem control CPU 208 and 408 of the satellite multifunction gateway 200 and 400, respectively. In operation 2060, the TCP functionality generates TCP acknowledgement packets back to the network switch/router 210 and 410 of the multifunction gateway 200 and 400, respectively, while the network switch/router 210 and 410 routes the data packet to the LAN ports 212 and 412, respectively.

Figure 13:
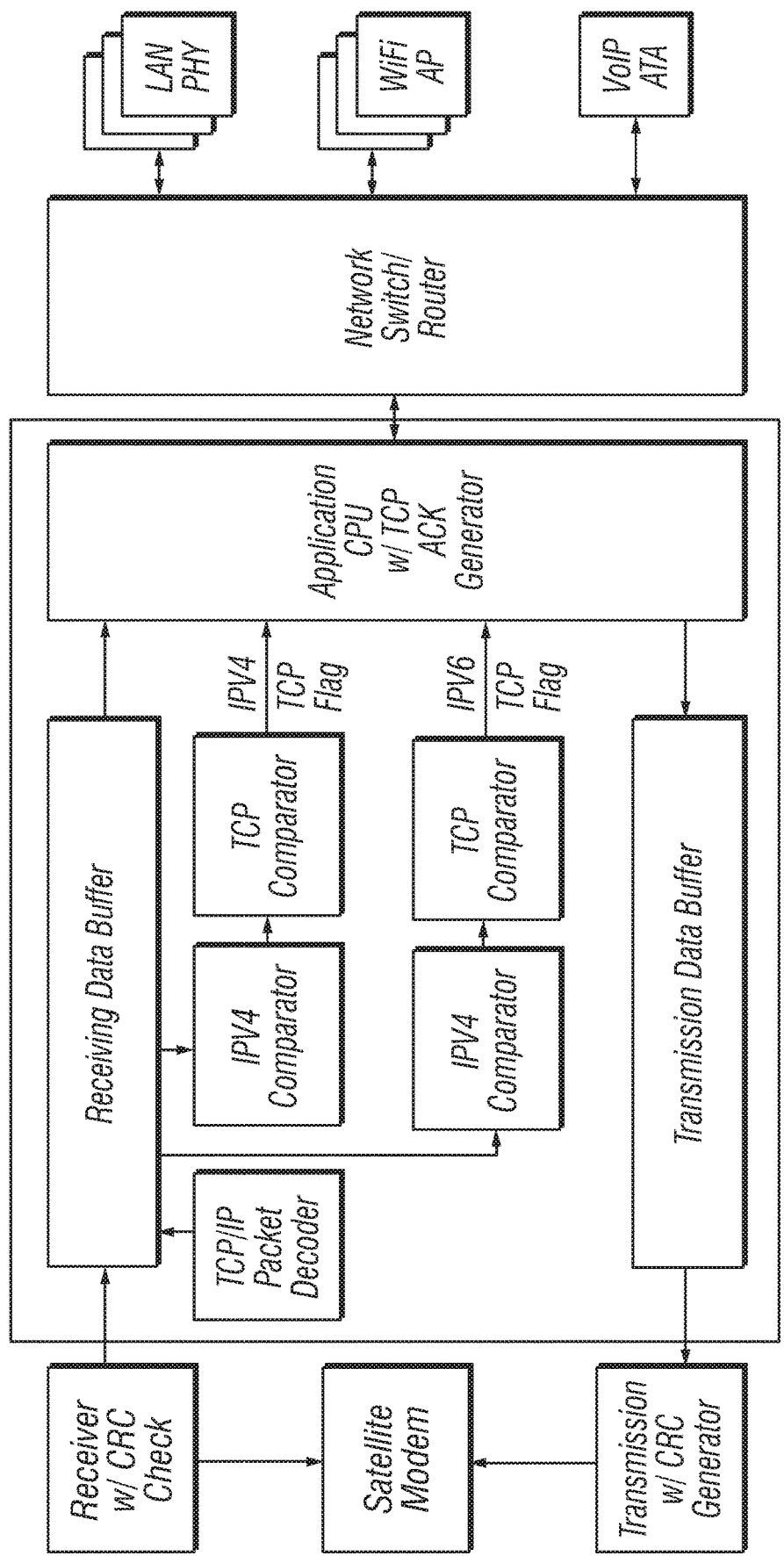
FIG. 13 is a conceptual block diagram illustrating an example of the functionality of a hardware TCP accelerator built in front of a CPU as employed within a satellite multifunction gateway as shown in FIGS. 4 and 7.
Figure 14:
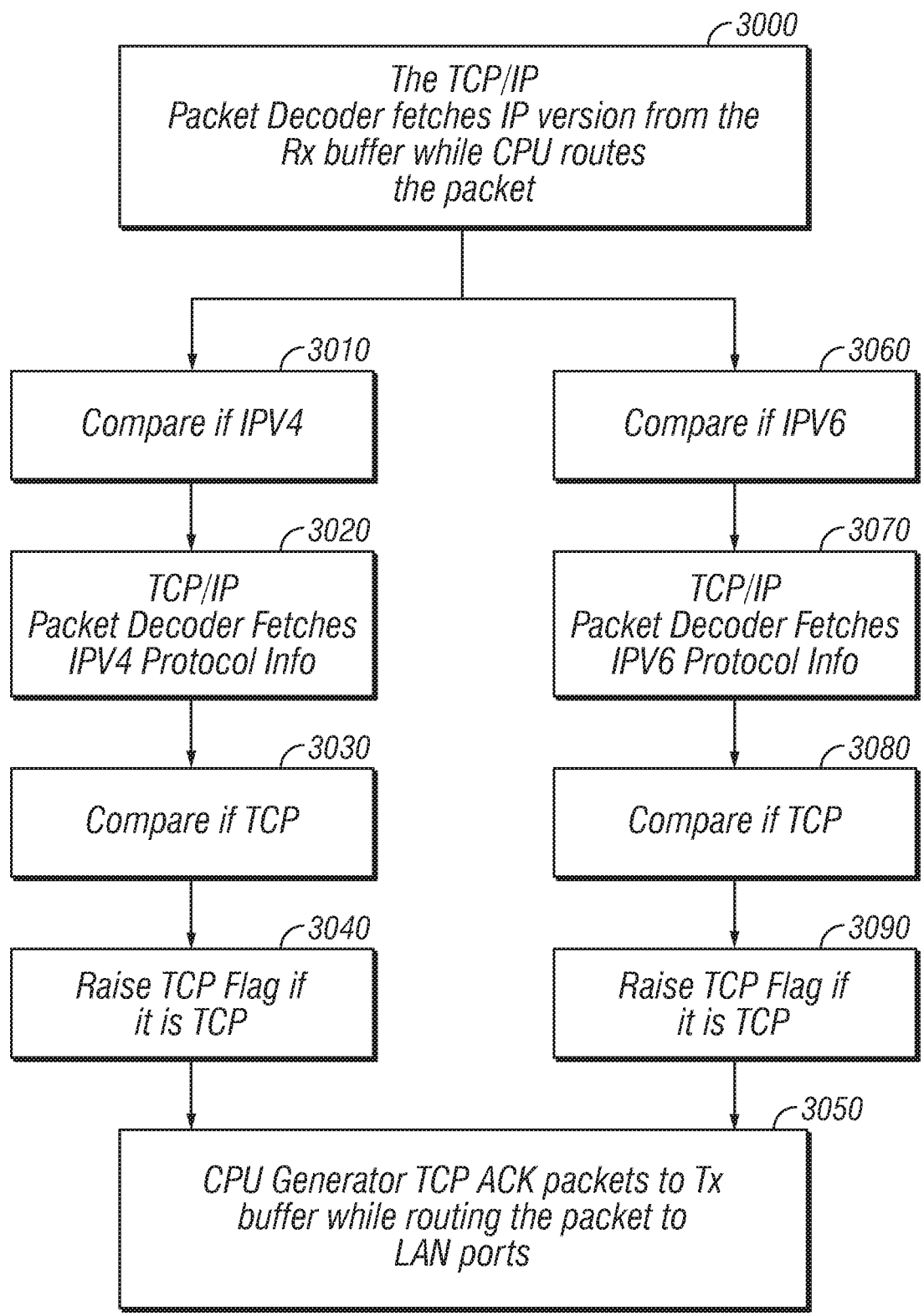
FIG. 14 is a flow chart illustrating an example of operations performed using the hardware TCP accelerator as shown in FIG. 13.

FIG. 13 is a conceptual block diagram illustrating another example of the functionality of a hardware TCP accelerator which, in this configuration, is built in front of the modem control CPU 208 and 408 of the satellite multifunction gateway 200-1 and 400-1, respectively, as shown in FIGS. 4 and 7. FIG. 14 is a flow chart illustrating an example of operations performed by the hardware TCP accelerator as shown in FIG. 13. These operations are similar to those shown in FIG. 12.

During operation 3000 in FIG. 14, the network switch/router 210 and 410 fetches a data packet from the receiving data buffer 206 and 406, respectively, of the satellite multifunction gateway 200-1 and 400-1 while also routing the data packet. In operation 3010, the TCP accelerator functionality of the satellite multifunction gateway 200 and 400, respectively, whether the data packet is an Internet Protocol Version 4 (IPv4) data packet. If the data packet is an IPv4 data packet, in operation 3020, the TCP accelerator functionality of the satellite multifunction gateway 200-1 and 400-1 fetches IPv4 protocol information. Then, in operation 3030, the TCP accelerator functionality of the satellite multifunction gateway 200-1 and 400-1 determines whether the data packet is a TCP data packet. In operation 3040, the TCP accelerator functionality provides a flag indicating that the data packet is a TCP data packet. Accordingly, in operation 3050, the TCP functionality generates a TCP acknowledgement packet back to the transmission data buffer 222 and 422 of the multifunction gateway 200-1 and 400-1, respectively, while routing the data packet to the LAN ports 212 and 412, respectively.

As further shown in FIG. 12, in operation 3060, the TCP accelerator functionality of the satellite multifunction gateway 200-1 and 400-1, respectively, whether the data packet is an Internet Protocol Version 6 (IPv6) data packet. If the data packet is an IPv6 data packet, in operation 3070, the TCP accelerator functionality of the satellite multifunction gateway 200-1 and 400-1 fetches IPv6 protocol information. Then, in operation 3080, the TCP accelerator functionality of the satellite multifunction gateway 200 and 400 determines whether the data packet is a TCP data packet. In operation 3090, the TCP accelerator functionality provides a flag indicating that the data packet is a TCP data packet. Accordingly, in operation 3050, the TCP functionality generates a TCP acknowledgement packet back to the transmission data buffer 222 and 422 of the multifunction gateway 200-1 and 400-1, respectively, while routing the data packet to the LAN ports 212 and 412, respectively.

As can be appreciated from the above, the hardware TCP acceleration engine functionality as performed by the TCP accelerator within the network switch/routers 110 and 310, and as performed by the TCP accelerators 228 and 428, uses network filters at line speed to identify TCP packets without CPU parsing. The hardware TCP acceleration engine mirrors TCP packets to the modem control CPU 108, 208, 308 and 408 for spoofing while routing all traffic directly to its destination. The modem control CPU 108, 208, 308 and 408 receives the identified TCP packets such that the spoofing workload would be reduced by more than, for example, 75% or by any other suitable amount as understood in the art. The hardware TCP accelerator identifies TCP packets and can, for example, drop user datagram protocol (UDP) packets. The hardware TCP acceleration feature also increases the network speed and supports QoS and video streaming for non-TCP traffic. Hence, as understood by one skilled in the art, by offloading CPU parsing, the hardware TCP acceleration feature can reduce cost for the satellite multifunction gateway 100, 200, 200-1, 300, 400 and 400-1 because, for example, a less powerful processor is required to achieve an increased performance benefit.

The embodiments described herein can be employed in, for example, the Jupiter satellite system deployed by Hughes Network Systems, any existing or previous HN/HX satellite modem platforms by Hughes Network Systems, as well as any present or future consumer, enterprise, or military/DISD (Defense and Intelligence Systems Division) satellite modem design, or other type of communication system as understood in the art.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A satellite user terminal gateway comprising:
a transceiver configured to communicate with a satellite communication network to receive data packets from the satellite communication network;
a data buffer configured to output the data packets;
a central processor configured to control the transceiver and receive the data packets output from the data buffer;
a router configured to receive the data packets; and
a transmission control protocol acceleration engine configured to receive data packets, identify transmission control protocol data packets among the received data packets, mirror the transmission control protocol data packets back to the central processor for spoofing while routing the received data packets through the satellite user terminal gateway to a destination, and generate a transmission control protocol acknowledgement data packet.

2. The satellite user terminal gateway according to claim 1, wherein
the router includes the transmission control protocol acceleration engine and is configured to route the received data packets.

3. The satellite user terminal gateway according to claim 1, wherein
the transmission control protocol acceleration engine is configured to identify and mirror the transmission control protocol data packets within layer 3 of the satellite user terminal gateway.

4. The satellite user terminal gateway according to claim 1, wherein
the router is configured to route the received data packets, the transmission control protocol acceleration engine being disposed in front of the router with respect to a flow direction of the received data packets.

5. The satellite user terminal gateway according to claim 1, wherein
the transmission control protocol acceleration engine is configured to identify and mirror the transmission control protocol data packets within layer 2 of the satellite user terminal gateway.

6. The satellite user terminal gateway according to claim 1, wherein
the transmission control protocol acceleration engine is disposed in front of the central processor with respect to a flow direction of the received data packets.

7. The satellite user terminal gateway according to claim 1, further comprising
a Voice Over IP (VoIP) gateway configured to receive the received data packets being routed through the satellite user terminal gateway.

8. The satellite user terminal gateway according to claim 1, further comprising
a local area network port configured to receive the received data packets being routed through the satellite user terminal gateway.

9. The satellite user terminal gateway according to claim 1, further comprising
a WiFi access point router configured to receive the received data packets being routed through the satellite user terminal gateway.

10. The satellite user terminal gateway according to claim 1, further comprising
an analog telephone adapter configured to receive the received data packets being routed through the satellite user terminal gateway.

11. The satellite user terminal gateway according to claim 1, further comprising
a WiFi access point;
an analog telephone adapter; and
a WiFi access point router comprising a Voice Over IP (VoIP) gateway, the WiFi access point router being configured to communicate the received data packets to the WiFi access point in response to a request received at the WiFi access point, and being further configured to communicate the received data packets to the analog telephone adapter in response to a request for a telephone call.

12. The satellite user terminal gateway according to claim 1, further comprising a Voice Over IP (VoIP) gateway configured to receive the received data packets in response to a request for VoIP communication;

a local area network port configured to receive the received data packets in response to a request received at the local area network port;

a WiFi access point configured to receive the received data packets in response to a request received at the WiFi access point; and an analog telephone adapter configured to receive the received data packets in response to a request for a telephone call.

13. The satellite user terminal gateway according to claim 1, wherein
the transmission control protocol acceleration engine is configured to identify whether the transmission control protocol data packets are Internet Protocol Version 4 or Internet Protocol Version 6 data packets.

14. The satellite user terminal gateway according to claim 1, wherein
the transmission control protocol acceleration engine identifies the transmission control protocol data packets and mirrors the transmission control protocol data packets to the central processor while the central processor refrains from parsing the received data packets.

15. A method for controlling a satellite user terminal gateway comprising:
receiving data packets at the satellite user terminal gateway from the satellite communication network;
outputting the data packets from a data buffer to a central processor;
receiving, at a transmission control protocol acceleration engine, the data packets;
receiving by a router the data packets;
identifying, by the transmission control protocol acceleration engine, transmission control protocol data packets among the received data packets to mirror the transmission control protocol data packets back to the central processor disposed in the satellite user terminal gateway while routing the received data packets through the satellite user terminal gateway for spoofing while routing the received data packets through the satellite user terminal gateway to a destination; and
generating a transmission control protocol acknowledgement data packet.

16. The method according to claim 15, wherein
the identifying and mirroring of the transmission control protocol data packets occurs within layer 3 of the satellite user terminal gateway.

17. The method according to claim 15, wherein
the identifying and mirroring of the transmission control protocol data packets occurs within layer 2 of the satellite user terminal gateway.

18. The method according to claim 15, wherein
the identifying and mirroring of the transmission control protocol data packets occurs while the central processor refrains from parsing the received data packets.

* * * * *